United States Patent
Canady et al.

(10) Patent No.: US 12,492,381 B2
(45) Date of Patent: Dec. 9, 2025

(54) METHOD FOR COLD ATMOSPHERIC PLASMA EXOSOME THERAPY

(71) Applicant: Jerome Canady Research Institute for Advanced Biological and Technological Sciences, Takoma Park, MD (US)

(72) Inventors: Jerome Canady, Lakeland, FL (US); Xiaoqian Cheng, Fairfax, VA (US); Saravana Murthy, Owings Mills, MD (US); Lawan Ly, Annandale, VA (US); Taisen Zhuang, Rockville, MD (US)

(73) Assignee: Jerome Canady Research Institute for Advanced Biological and Technological Sciences, Takoma Park, MD (US)

( * ) Notice: Subject to any disclaimer, the term of this patent is extended or adjusted under 35 U.S.C. 154(b) by 813 days.

(21) Appl. No.: 17/611,461

(22) PCT Filed: May 22, 2020

(86) PCT No.: PCT/US2020/034388
§ 371 (c)(1),
(2) Date: Nov. 15, 2021

(87) PCT Pub. No.: WO2020/237216
PCT Pub. Date: Nov. 26, 2020

(65) Prior Publication Data
US 2022/0213443 A1 Jul. 7, 2022

Related U.S. Application Data

(60) Provisional application No. 62/967,935, filed on Jan. 30, 2020, provisional application No. 62/851,286, filed on May 22, 2019.

(51) Int. Cl.
| | |
|---|---|
| A61K 35/13 | (2015.01) |
| A61P 35/00 | (2006.01) |
| C12N 5/09 | (2010.01) |
| C12N 13/00 | (2006.01) |

(52) U.S. Cl.
CPC ............ *C12N 5/0693* (2013.01); *A61K 35/13* (2013.01); *A61P 35/00* (2018.01); *C12N 13/00* (2013.01); *C12N 2523/00* (2013.01)

(58) Field of Classification Search
None
See application file for complete search history.

(56) References Cited

U.S. PATENT DOCUMENTS

| | | | | |
|---|---|---|---|---|
| 2016/0160181 A1* | 6/2016 | Kreke | ................... | C12N 5/0657 514/44 A |
| 2021/0038641 A1* | 2/2021 | Abramov | ................ | A61P 35/04 |

FOREIGN PATENT DOCUMENTS

WO 2017/049166 A1 3/2017

OTHER PUBLICATIONS

K. Gilligan and R. Dwyer, "Engineering Exosomes for Cancer Therapy," Int. J. Mol. Sci. 2017, 18, 1122.
Bekeschus et al., Redox regulation of leukocyte-derived microparticle release and protein content in response to cold physical plasma-derived oxidants. Clinical Plasma Medicine, Jul. 31, 2017, No. 7, vol. 8, pp. 24-35. Especially p. 24 col. 2 para 2, p. 26 col. 1 para 2, p. 26 col. 1 para 4, p. 26 col. 2 para 3, p. 29 col. 1 para 2, p. 29 col. 2 para 2, p. 30 col. 1 para1.
Morishita et al., Exosome-based tumor antigenseadjuvant co-delivery utilizing genetically engineered tumor cell-derived exosomes with immunostimulatory CpG DNA, Biomaterials, Oct. 3, 2016, vol. 111, pp. 55-65, Especially p. 55 col. 2 para 1, p. 56 col. 1 para 2, p. 56 col. 2 para 1, p. 56 col. 2 para 5, p. 57 col. 2 para 5, p. 62 col. 1 para 1.
Bardos, et al., "Cold atmospheric plasma: Sources, processes, and applications," Thin Solid Films, vol. 518, Issue 23, Sep. 30, 2010, pp. 6705-6713.

* cited by examiner

*Primary Examiner* — Russell G Fiebig
(74) *Attorney, Agent, or Firm* — 24IP Law Group USA, PLLC; Timothy R DeWitt (57) ABSTRACT

A method for bioengineering exosomes for cancer treatment. The method comprises the steps of isolating target tumor cells from a tissue sample, culturing the isolated target tumor cells, treating the cultured target tumor cells with cold atmospheric plasma to release exosomes from the target tumor cells, and collecting the released exosomes. The step of culturing the target tumor cells may comprise seeding the isolated target tumor cells in wells and incubating the target tumor cells in a culture media, for example, for 24 hours. The culture media may comprise Dulbecco's Modified Eagle Medium, an antibiotic and 10% fetal bovine serum. The step of culturing the target tumor cells may further comprise replacing the culture media with Dulbecco's Modified Eagle Medium and an antibiotic. The target tumor cells may comprise, for example, one of U87 cells, KKU-055 cells and triple negative MDA-MB-231 cells.

13 Claims, 13 Drawing Sheets

U87 CAP Exo on fresh U87 cells in DMEM at 10X

U87 Mock Ctrl Exo on fresh U87 cells in DMEM at 10X

U87 cells Ctrl in DMEM at 10X

190913 KKU-055 12well Exosome 80p 5mins plate-1

|   | 1 | 2 | 3 | 4 |   |
|---|---|---|---|---|---|
| A | 0.658 | 0.693 | 0.808 | 0 | correction |
| B | 0.61 | 0.631 | 0.822 | 0.804 | correction |
| C | 0.645 | 0.669 | 0.781 | 0.698 | correction |

190913 KKU-055 12well Exosome 80p 5mins plate-2

|   | 1 | 2 | 3 | 4 |   |
|---|---|---|---|---|---|
| A | 0.736 | 0.732 | 0.849 | 0 | correction |
| B | 0.658 | 0.697 | 0.691 | 0.781 | correction |
| C | 0.662 | 0.686 | 0.777 | 0.738 | correction |

| | | | | |
|---|---|---|---|---|
| Average | 0.6615 | 0.684667 | 0.788 | 0.75525 |
| Std Deviation | 0.037638 | 0.030521 | 0.049759 | 0.040665557 |
| SEM | 0.0168 | 0.0136 | 0.0223 | 0.023347827 |

| Viability (%) | 25uL Exosome 80p 5 mins | Mock | Supernatant |
|---|---|---|---|
|  | 87.58689 | 90.65431 | 104.3363 |
| SEM | 2.544522 | 1.993361 | 2.823996 |

FIG. 9B

190913 KKU-055 12well Exosome 120p 5mins plate-1

|   | 1 | 2 | 3 | 4 |   |
|---|---|---|---|---|---|
| A | 0.795 | 0.755 | 0.786 | 0 | correction |
| B | 0.653 | 0.878 | 0.698 | 0.818 | correction |
| C | 0.783 | 0.678 | 0.802 | 0.742 | correction |

190913 KKU-055 12well Exosome 120p 5mins plate-2

|   | 1 | 2 | 3 | 4 |   |
|---|---|---|---|---|---|
| A | 0.734 | 0.733 | 0.819 | 0 | correction |
| B | 0.676 | 0.637 | 0.718 | 0.736 | correction |
| C | 0.758 | 0.708 | 0.77 | 0.688 | correction |

| | | | | |
|---|---|---|---|---|
| Average | 0.733167 | 0.698167 | 0.7655 | 0.741 |
| Std Deviation | 0.052629 | 0.038933 | 0.04368 | 0.351992424 |
| SEM | 0.0235 | 0.0174 | 0.0195 | 0.030664855 |

| Viability (%) | 25uL Exosome 120p 5 mins | Mock | Supernatant |
|---|---|---|---|
|  | 98.94287 | 94.21952 | 103.3363 |
| SEM | 3.210236 | 2.493892 | 2.551817 |

| 1 | 2 | 3 | 4 |
|---|---|---|---|
| Exo from KKU CAP treated cells at 120p for 5min. Exo volume 50uL | Exo from KKU CAP untreated cells (mock). Exo volume 50uL | Supernatant from KKU CAP treated cells at 120p for 5min. Supernatant volume 50uL | Blank |
| Exo from KKU CAP treated cells at 120p for 5min. Exo volume 50uL | Exo from KKU CAP untreated cells (mock). Exo volume 50uL | Supernatant from KKU CAP treated cells at 120p for 5min. Supernatant volume 50uL | KKU control cells |
| Exo from KKU CAP treated cells at 120p for 5min. Exo volume 50uL | Exo from KKU CAP untreated cells (mock). Exo volume 50uL | Supernatant from KKU CAP treated cells at 120p for 5min. Supernatant volume 50uL | KKU control cells |

Plate 1

FIG. 12A

| 1 | 2 | 3 | 4 |
|---|---|---|---|
| Exo from KKU CAP treated cells at 120p for 7min. Exo volume 50uL | Exo from KKU CAP untreated cells (mock). Exo volume 50uL | Supernatant from KKU CAP treated cells at 120p for 7min. Supernatant volume 50uL | Blank |
| Exo from KKU CAP treated cells at 120p for 7min. Exo volume 50uL | Exo from KKU CAP untreated cells (mock). Exo volume 50uL | Supernatant from KKU CAP treated cells at 120p for 7min. Supernatant volume 50uL | KKU control cells |
| Exo from KKU CAP treated cells at 120p for 7min. Exo volume 50uL | Exo from KKU CAP untreated cells (mock). Exo volume 50uL | Supernatant from KKU CAP treated cells at 120p for 7min. Supernatant volume 50uL | KKU control cells |

Plate 2

FIG. 12B

| Samples | Average | STD Dev | SEM | | % compared to control | % SEM |
|---|---|---|---|---|---|---|
| 5 mins Exo | 0.009 | 0.005 | 0.004 | 5 mins Exo | 16.21621622 | 6.32772 |
| 5 mins Suprnt | 0.083 | 0.010 | 0.007 | 5 mins Suprnt | 150.1501502 | 12.83937 |
| 7 mins Exo | 0.014 | 0.002 | 0.001 | 7 mins Exo | 25.22522523 | 2.080542 |
| 7 mins Suprnt | 0.082 | 0.013 | 0.009 | 7 mins Suprnt | 147.1471471 | 16.26064 |
| Mock Exo | 0.071 | 0.012 | 0.003 | Mock Exo | 127.3273273 | 5.089182 |
| Control | 0.056 | 0.015 | 0.009 | | | |

METHOD FOR COLD ATMOSPHERIC PLASMA EXOSOME THERAPY

CROSS-REFERENCE TO RELATED APPLICATIONS

The present application claims the benefit of the filing date of U.S. Provisional Patent Application Ser. No. 62/851,286 filed by the present inventors on May 22, 2019, and U.S. Provisional Patent Application Ser. No. 62/967,935 filed by the present inventors on Jan. 30, 2020.

The aforementioned provisional patent application is hereby incorporated by reference in its entirety.

STATEMENT REGARDING FEDERALLY SPONSORED RESEARCH OR DEVELOPMENT

None.

BACKGROUND OF THE INVENTION

Field of the Invention

The present invention relates to Bioengineering Exosomes for Cancer Therapy utilizing Cold Atmospheric Plasma.

Brief Description of the Related Art

There is exciting potential for exosomes as therapeutic vehicles for cancer treatment. Successful implementation in the clinical setting will be dependent upon establishment of rigorous standards for exosome manipulation, isolation, and characterization. See, K. Gilligan and R. Dwyer, "Engineering Exosomes for Cancer Therapy," Int. J. Mol. Sci. 2017, 18, 1122. See also International Patent Application WO 2017/049166 entitled "CAR T CELL THERAPIES WITH ENHANCED EFFICACY." The foregoing references are hereby incorporated by reference in their entirety.

SUMMARY OF THE INVENTION

In a preferred embodiment, the present invention is a method for bioengineering exosomes for cancer treatment. The method comprises the steps of isolating target tumor cells from a tissue sample, culturing the isolated target tumor cells, treating the cultured target tumor cells with cold atmospheric plasma to release exosomes from the target tumor cells, and collecting the released exosomes. The step of culturing the target tumor cells may comprise seeding the isolated target tumor cells in wells and incubating the target tumor cells in a culture media, for example, for 24 hours. The culture media may comprise Dulbecco's Modified Eagle Medium, an antibiotic and 10% fetal bovine serum. The step of culturing the target tumor cells may further comprise replacing the culture media with Dulbecco's Modified Eagle Medium and an antibiotic. The target tumor cells may comprise, for example, one of U87 cells, KKU-055 cells and triple negative MDA-MB-231 cells.

The step of treating the cultured target tumor cells with cold atmospheric plasma to release exosomes from the target tumor cells may comprise treating the target tumor cells with cold atmospheric plasma for 4-10 minutes. The method may further comprise the step of incubating the target cancer cells after the step of treating the cultured target tumor cells with cold atmospheric plasma to release exosomes from the target tumor cells and before the step of collecting the released exosomes to produce conditioned media.

The step of collecting the released exosomes may comprise removing the conditioned media from the wells, differentially centrifuging the conditioned media, collecting a supernatant, mixing the collected supernatant with an exosome isolation reagent, incubating the mixture of the collected supernatant and the exosome isolation reagent, centrifuging the mixture and collecting an exosome pellet, and resuspending the exosome pellet in a buffering solution. The step of differentially centrifuging the conditioned media may comprise centrifuging the conditioned media at 300×g, 1500×g, 4500×g and 10,000×g. The step of collecting the released exosomes may further comprise storing the resuspended exosomes at −80 C.

In another preferred embodiment, the present invention is a method for treatment of a patient using cold atmospheric plasma exosome therap. The method comprises the steps of isolating target tumor cells from a tissue sample, culturing the isolated target tumor cells, treating the cultured target tumor cells with cold atmospheric plasma to release exosomes from the target tumor cells, collecting the released exosomes and infusing the collected exosomes into a patient.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

The present invention is described with reference to the drawings and the experiments as described below.

Exosomes produced and released by tumor cells contain various biomolecules that can be transmitted to recipient cells. In normal cells exosome biogenesis is very complex, highly organized and regulated, however, this process is altered in cancer cells due to high cell proliferation rates of these cells tends to be exacerbate the exosome release, moreover during stressful conditions such as chemotherapeutics exosomes release is accelerated. The Canady Cold Atmospheric Plasma (CAP) treatment accelerates the exosome release several folds. During the cell death/apoptosis process exosomes released from the CAP treated cell carry miRNAs, mRNAs, noncoding RNAs, proteins and lipids. These biomolecules carry the cell death or apoptosis information via the exosomes which in turn negatively regulate the cell viability and lead to apoptosis in the distant cells. The exosome miRNAs have been shown to negatively regulate target mRNA expression by repressing translation or by inducing mRNA degradation (PubMed: 19167326; PubMed: 15211354). During the CAP treatment a subset of key tumor-suppressive miRNAs like ones documented in other studies (PMID: 26890143) are trafficked into the exosomes and these miRNAs induce cell death in the recipient cells. Moreover, tumor cell exosome release is inhibited by previously secreted tumor exosomes that are still present in the microenvironment, creating a balancing negative feedback control loop (PMID: 24462375). Collectively exosomes released from CAP treated cancer cells can directly induce cell death in the recipient cancer cells.

Furthermore, growing evidence have shown that dendritic cells (DC) are loaded with tumor derived exosomes (PMID: 29416821). DC readily take up tumor derived exosomes (PMID: 17073943) and the antigen present in tumor derived exosomes can be cross-presented by MHC-I molecules to T lymphocytes (PMID: 22898052; PMID: 23707941) in turn stimulating a strong T lymphocyte mediated antitumor immunity. The exosomes derived from CAP treated tumor cells will induce an antitumor immune response by similar process.

Figure 1:
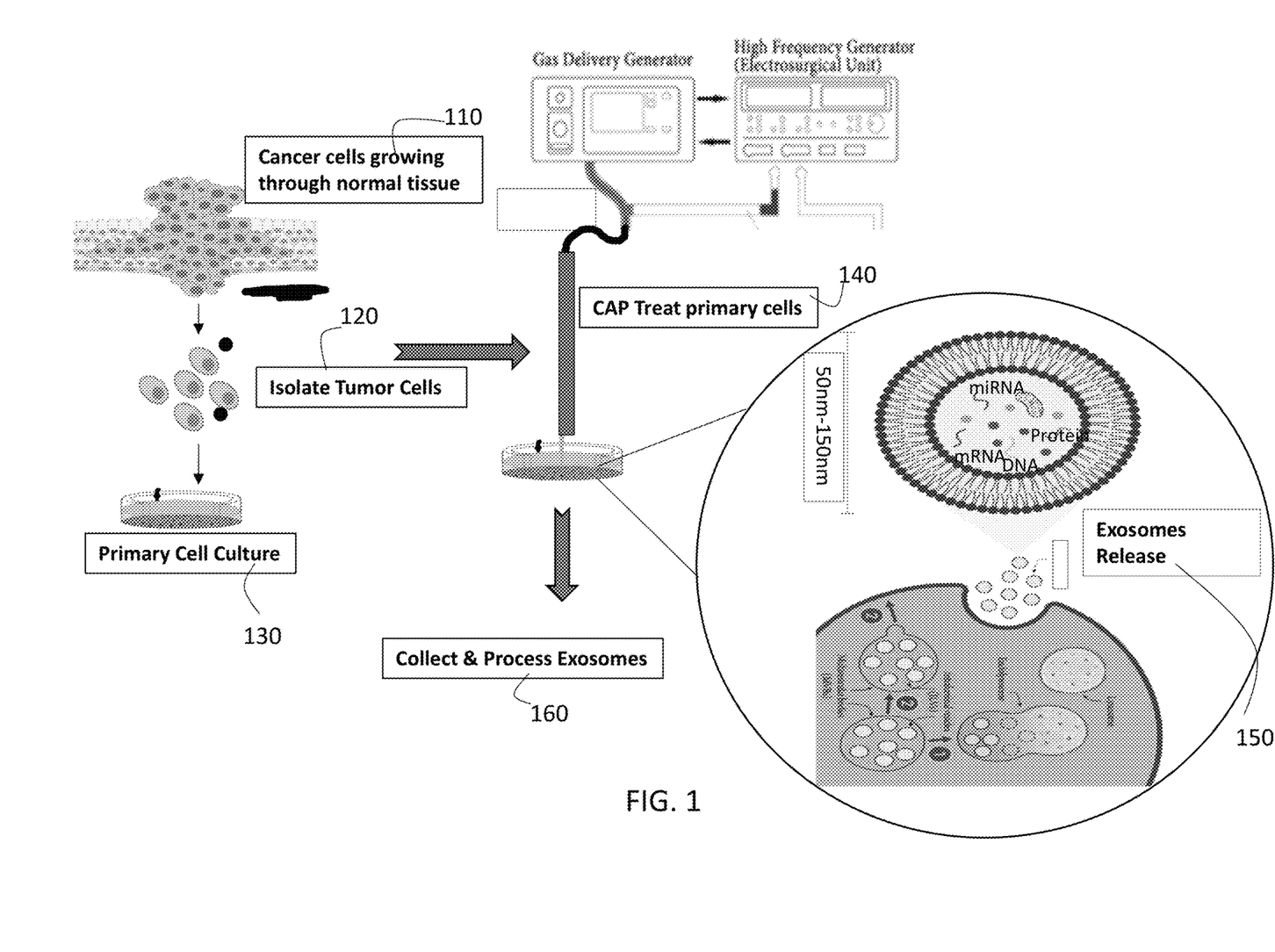
FIG. 1 illustrates a method for collecting and processing exosomes in accordance with a preferred embodiment of the present invention.

From this, a therapy can be developed for using exosomes to treat cancer in a patient. A process for collecting and processing exosomes is described with reference to FIG. 1. Cancer cells grow through normal tissue 110. Tumor cells are isolated 120. A primary cell culture is prepared. 130. The primary cells are treated with cold atmospheric plasma (CAP) 140. Exosomes are released 150. The exosomes are collected and processed 160.

Figure 2:
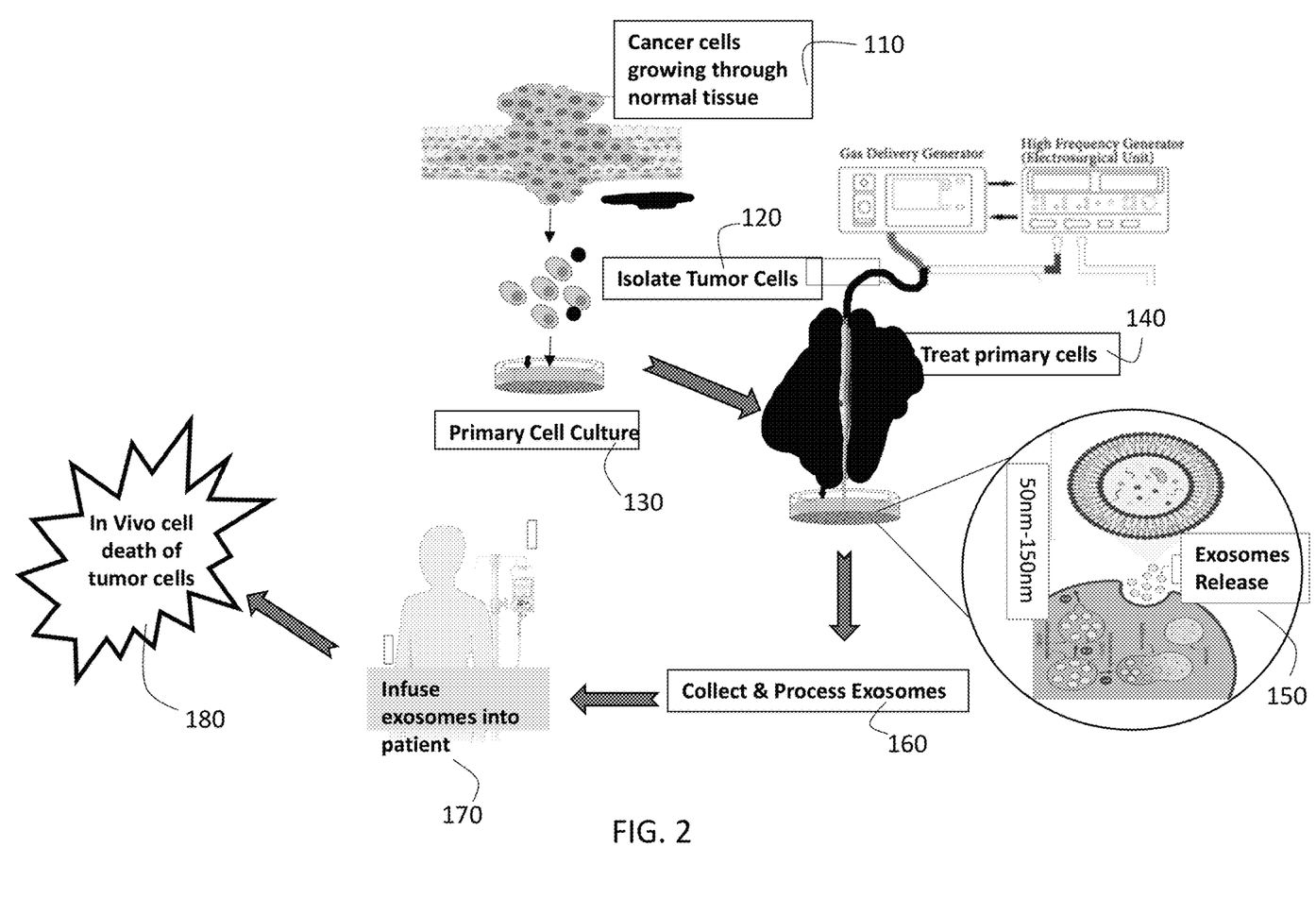
FIG. 2 illustrates a method for treating a patient with harvested exosomes in accordance with a preferred embodiment of the present invention.

As shown in FIG. 2, the collected and processed exosomes are infused into a patient 170. In vivo death of the tumor cells occurs due to the infusions of the exosomes 180.

Figure 3A:
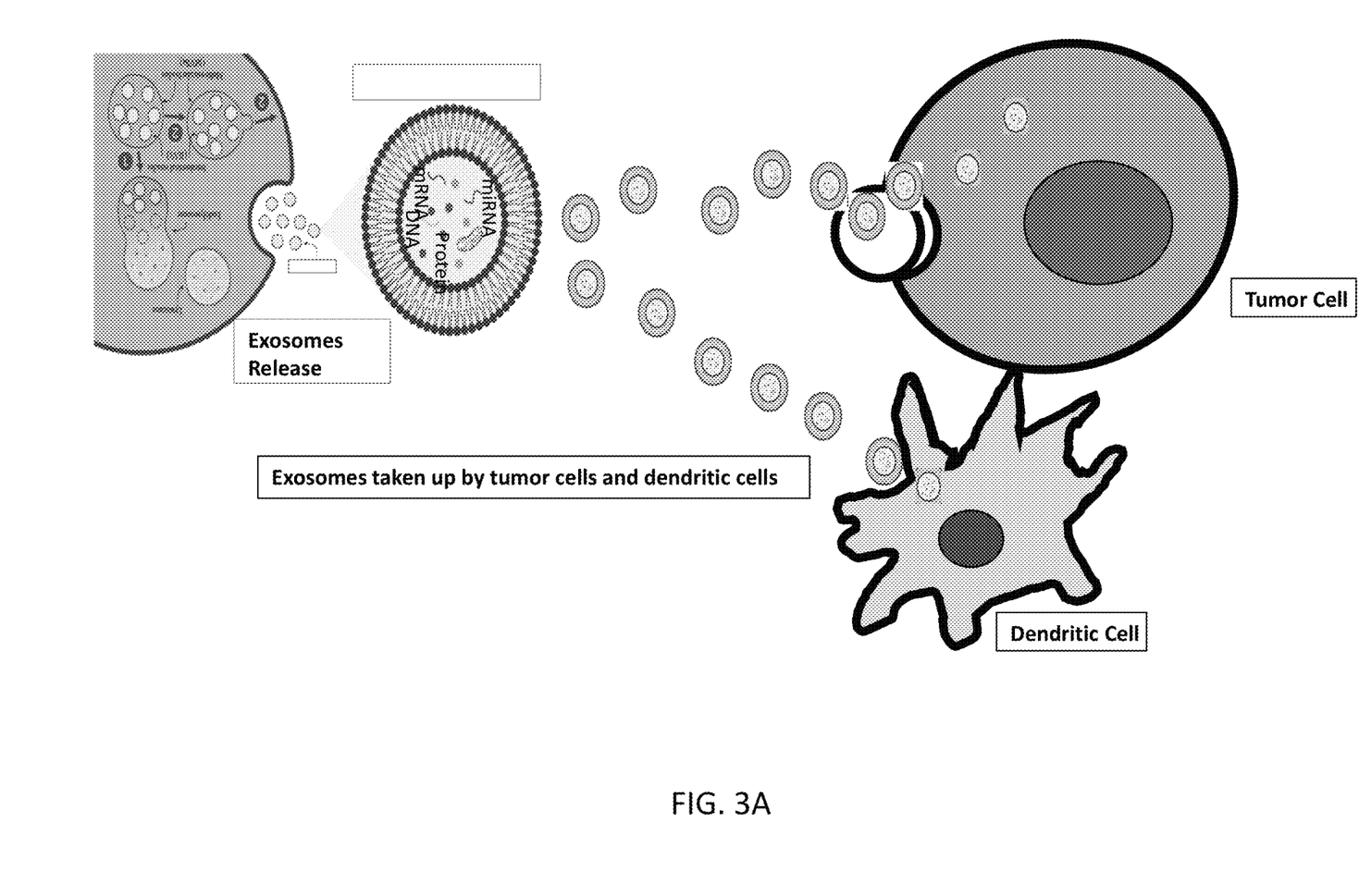
FIGS. 3A and 3B illustrates how exosomes are taken up by tumor calls and dendritic cells in accordance with a preferred embodiment of the present invention.
Figure 3B:
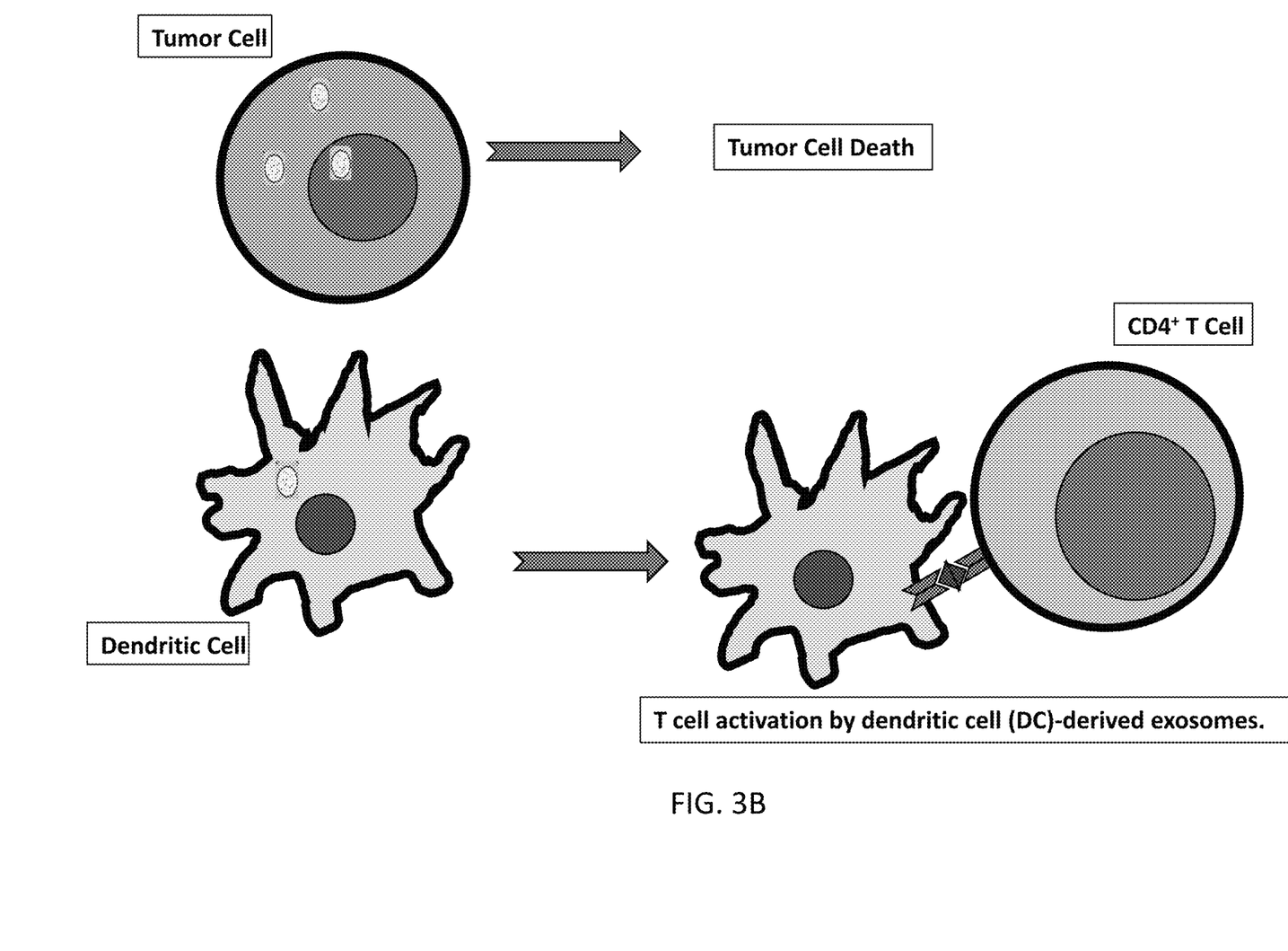

FIGS. 3A-3B illustrate how the infusion of exosomes results in death of the tumor cells and activation of T cells. As shown in FIG. 3A, the released exosomes are taken up by tumor cells and dendritic cells. As shown in FIG. 3B, the tumor cells die as a result of taking up the exosomes. The dendritic cell, however, activates T cells.

Example 1

The objective of the study was to find the effects of Cold Atmospheric Plasma (CAP) treatment on exosome realize from Glioblastoma Cell line U87 and harvesting and application of these exosomes on CAP untreated U87 cells and their survival outcome. For this, cold atmospheric plasma treatment was performed on U87 cells and the secreted exosomes were harvested by polymer precipitation based method. These exosomes were applied to CAP untreated U87 cells. After 24 hours of exosome treatment the U87 cells showed significant increase in apoptosis and cell death in imaging and flow cytometry analysis. These preliminary results suggest that exosomes realized from the cancer cells after CAP treatment is a potent inducer of cell death. The mechanistic study of exosomes realize after CAP treatment and complete analysis of exosomes cargo is warranted.

1. Exosome Generation

Figure 4:
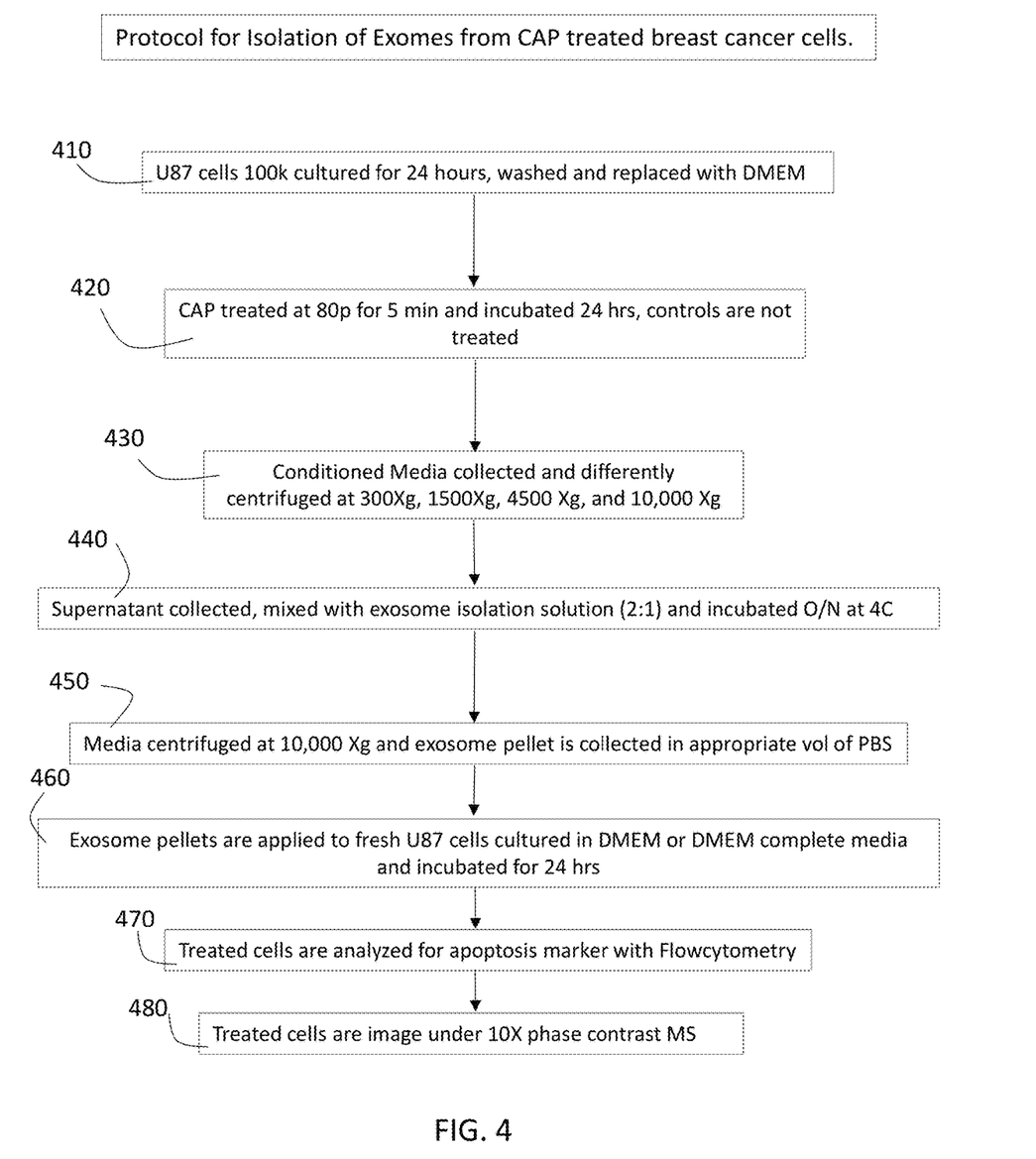
FIG. 4 is a flow chart of a protocol for isolation of exosomes from CAP treated breast cancer cells in Example 1.

An example of exosome generation is described with reference to FIG. 4. The U87 cells were seeded at 100 k cells/well in a 12 well plate and incubated at 37 C, 5% CO2 in the culture media was Dulbecco's Modified Eagle Medium (DMEM)+antibiotic (penicillin and streptomycin (P/S))+10% fetal bovine serum (FBS) for 24 hours 410. After the incubation period the media was replaced with DMEM+P/S and CAP treated at 80P for 5 min as determined by preliminary in vitro results by MTT assay of U87 cell lines, control cell did not receive CAP treatment 420. The cells were then incubated for 24 hours under the conditions described above. After incubation period the conditioned media was removed and an exosome harvesting procedure was carried out.

2. Exosome Harvesting

The conditioned media was collected and differentially centrifuged at 300×g, 1500×g, 4500×g and 10,000×g 430. The supernatant collected and the final centrifuged step were mixed with exosome isolation solution (Total Exosome Isolation Reagent, Thermo) and incubated overnight at 4 C 440. The next day the conditioned media was centrifuged at 10,000×g and exosome pellet were collected and resuspended in appropriate volume of phosphate buffered saline (PBS) and stored at −80 C until used 450.

3. Application of Exosome

The U87 cells were seeded at 100 k cells/well in a 12 well plate and incubated at 37 C, 5% CO2 in the culture media was DMEM+P/S+10% FBS for 24 hours 460. After the incubation period the media was replaced with DMEM+P/S and CAP treated and control exosomes were applied to the U87 cells and incubated at 37 C, 5% CO2 for 24 hours. Apoptosis, necrosis and cell death were analyzed by flow cytometry following standard procedure 470. Cells were imaged with phase contrasting microscope at 10× objective 480.

Figure 5:
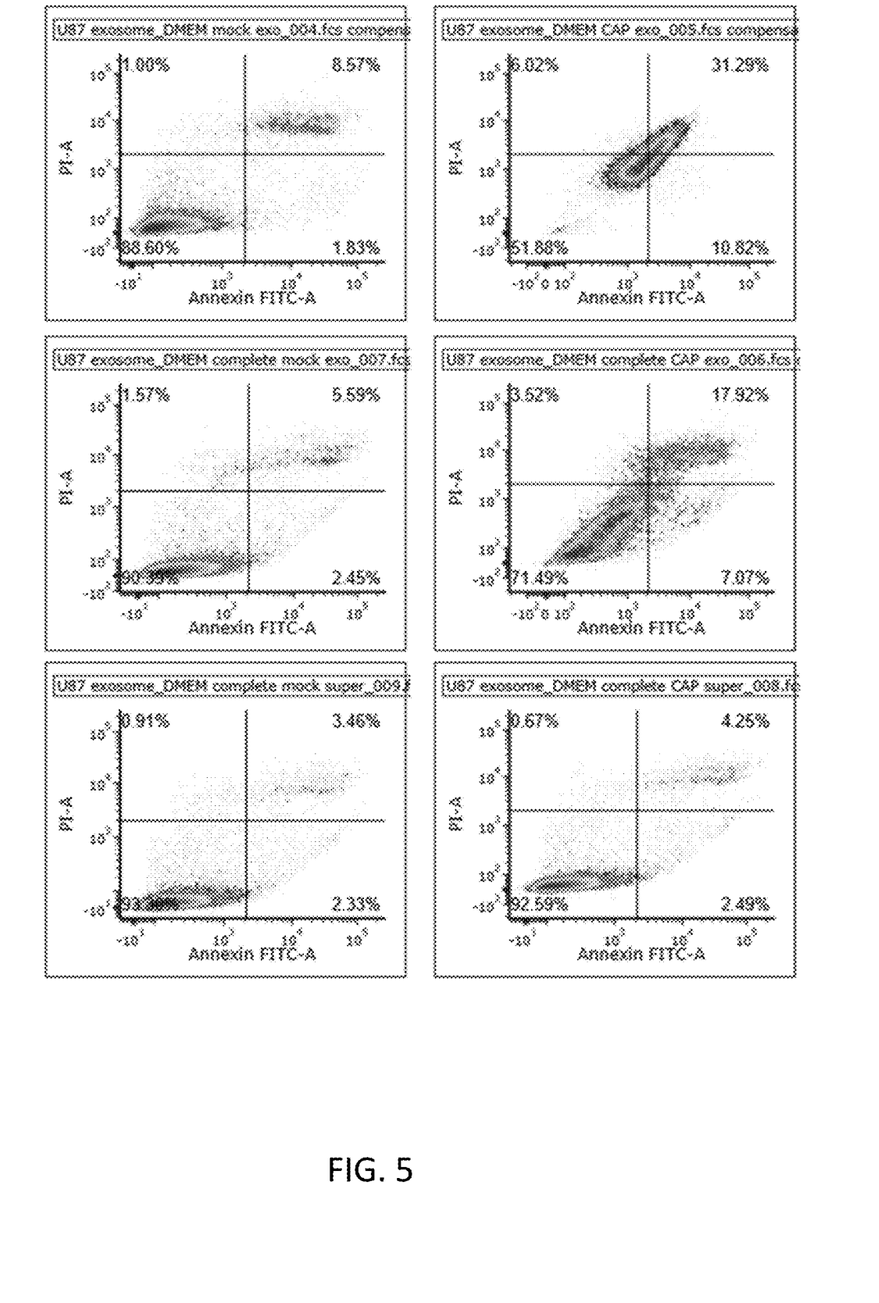
FIG. 5 is a set of graphs illustrating results of the Example 1 described herein.

FIG. 5 shows images showing U87 dead cells after 24 hours CAP treated exosome treatment, whereas no cell death in no CAP treated exosome treatment or untreated control cells.

Figure 6:
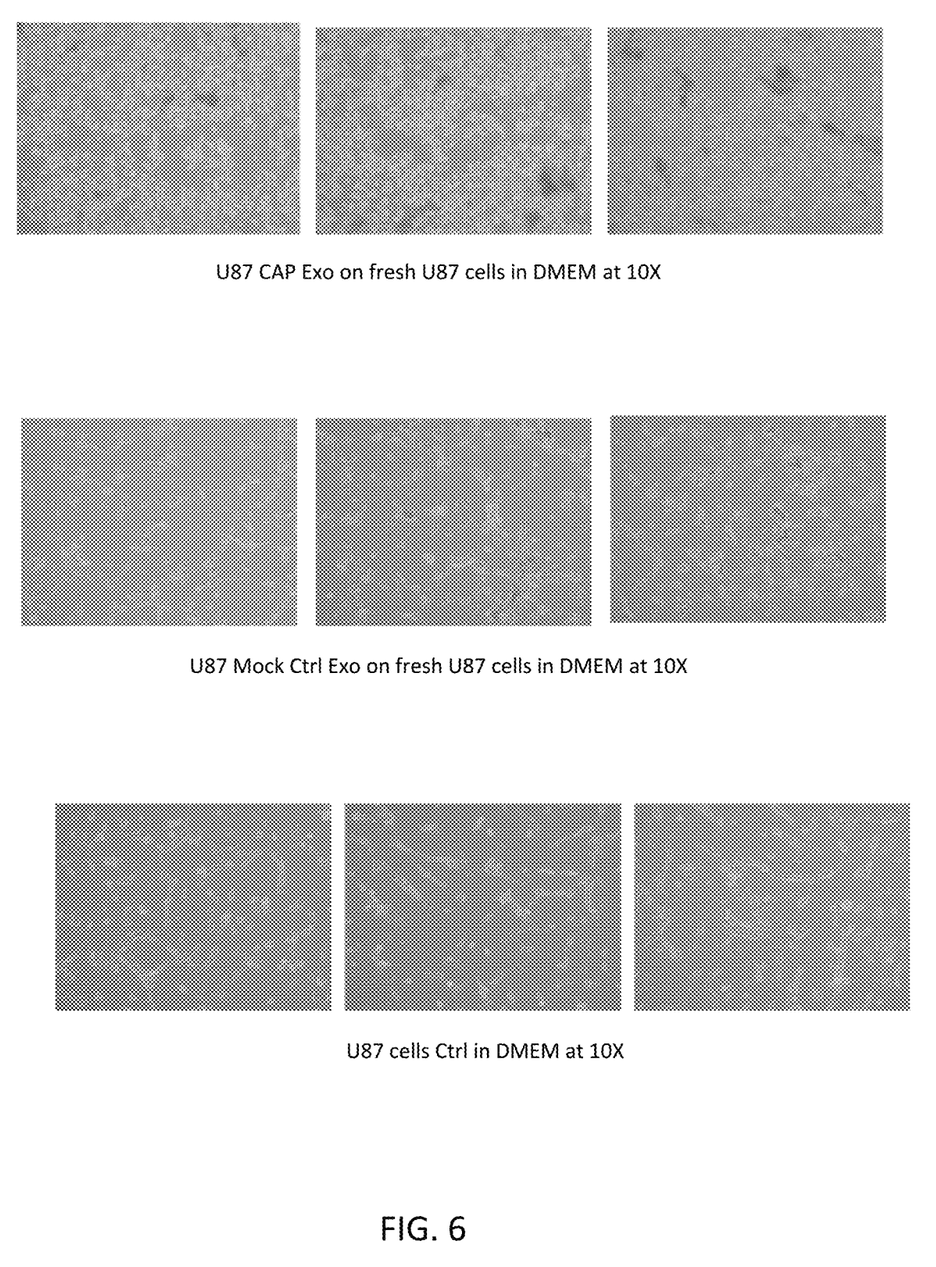
FIG. 6 is a set of images showing results of examples described herein.

FIG. 6 illustrates flow cytometry results. Flow cytometry graphs show a majority of the live cells in mock control sample (top left) whereas cells are in necrosis, apoptosis stages in CAP exosomes treated cells.

4. Conclusions

Exosomes generated with CAP treatment can be used to induce cell death in glioblastoma cancer cell lines. A comprehensive cell line set can be analyzed and different exosome concentration, incubation time and treatment procedure can be determined.

Example 2

Day 1

The objective of this experiment was to determine which CAP power settings yields more exosomes with/without CAP treatment @ 80p and 120p 5 mins in KKU-055 cells.

| Cell type | Total | Live | % | AVG viable cells | media |
|---|---|---|---|---|---|
| KKU-055 P14 | 1.89* 10^6 | 1.42 * 10^6 | 75 | 1.26* 10^6 | DMEM |
| Do | 1.6 * 10^6 | 1.1 * 10^6 | 69 | | complete |

Procedure: Cholangiocarcinoma (CCA) KKU-055 reference liver cancer cell line was selected for current study. KKU-055 are derived from intrahepatic CCA, the cell line was obtained from the Japanese Collection of Research Bioresources Cell Bank (Osaka, Japan). The cell line was cultured in DMEM Medium supplemented with 10% fetal bovine serum (Sigma-Aldrich, St. Louis, MO, USA) and 1% Pen Strep (Thermo Fisher Scientific, Waltham, MA, USA) in a 37° C. and 5% CO2 humidified incubator (Thermo Fisher Scientific, Waltham, MA, USA). When cells reached approximately 80% confluence, cells were seeded at a concentration of $10^5$ cells/well into 12-well plates (USA Scientific, Ocala, FL, USA) with a 1 mL media volume per well.

KKU-055 cells were seeded at a density of 100 k cells/well in 4×12 wells plates each.

Day 2

Figure 7A:
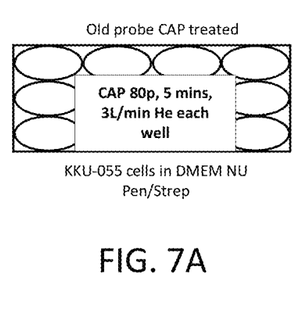
FIGS. 7A-7C illustrate plate designs of for Example 2 on KKU-055 cancer cells.
Figure 7B:
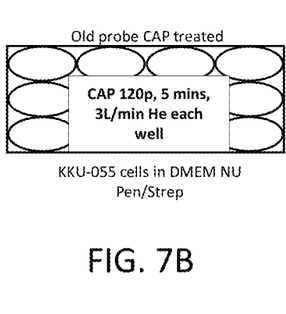
Figure 7C:
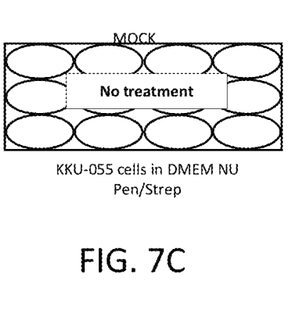

Procedure: The media KKKU-055 cells that were seeded on Day 1 were changed to DMEM+Synthetic serum+Pen/Strep media and CAP treated and Mock treated and incubated for 24 hours after CAP treatment (FIGS. 7A-7C). Exosome isolation procedure were performed following standard procedure.

Day 3

Procedure: The Exosome solution (30% polyethylene glycol (PEG-8 k)) was used to precipitate exosomes from the supernatants of experiment Day 2 with the following procedure.

1. Conditioned Media collected and differentially centrifuged at 300×g, 1500×g, 4500×g and 10,000×g for 15 mins each
2. Supernatant collected (at total of ~9.5 mL was recovered in each plate), 9 mL supernatant from each condition were either mixed with 9 mL in house exosomes sol 5 and incubated O/N at 4 C Day 4

The O/N incubated Supernatant-exosome isolation solution mixed were centrifuged at 10K g for 60 mins. The KKU-055 cell treated with CAP 120p had visibly more exosome pellets than CAP 80p and the pellets were resuspended in 50 uL vol of PBS and stored at −80 C ($2^{nd}$ shelf Exosome Box 2) until use.

Example 3

Day 1

Figure 8A:
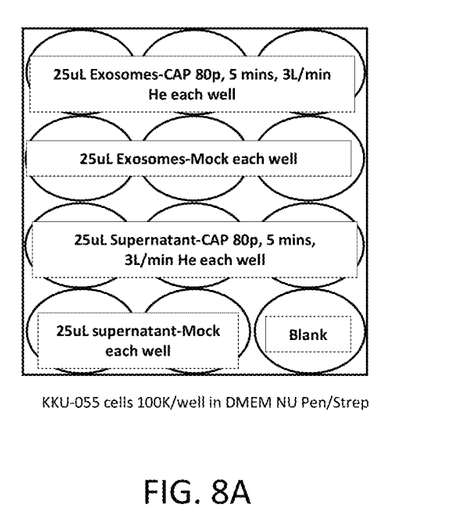
FIGS. 8A and 8B illustrate plate designs of Example 3 for 25 uL exosome-CAP from 80p or 120p 5 mins CAP treated KKU-055 cells treated on untreated KKU-055 cells.
Figure 8B:
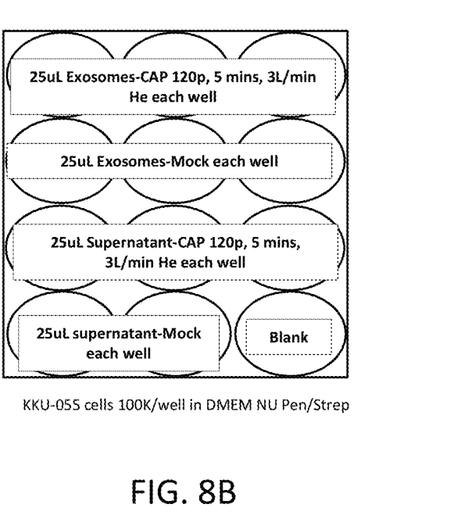
Figure 9A:
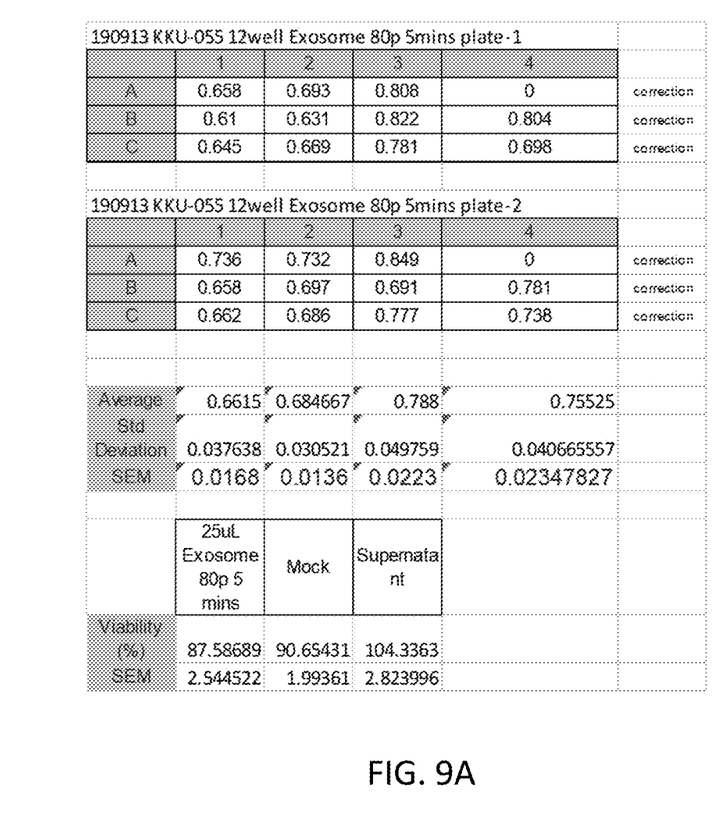
FIGS. 9A and 9B are tables showing the raw data of MTT assay for the plate experiment of 25 uL exosome-CAP from 80p or 120p 5 mins CAP treated KKU-055 cells treated on untreated KKU-055 cells.
Figure 9B:
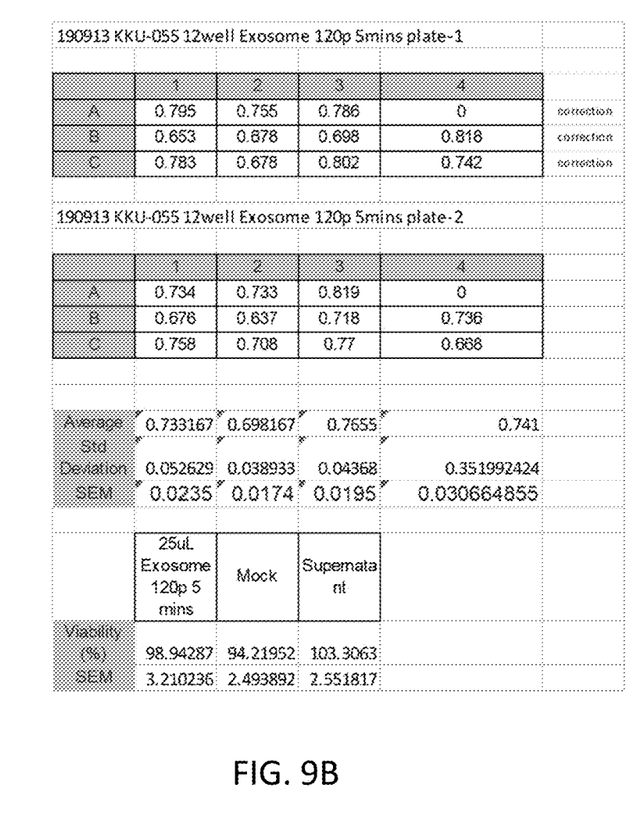
Figure 10A:
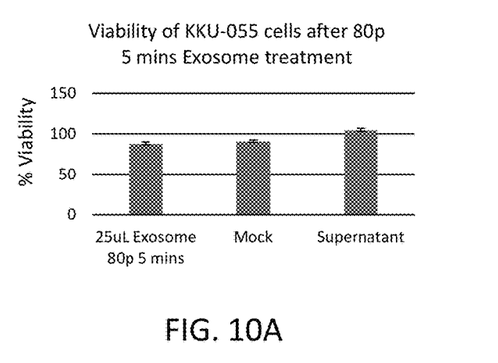
FIGS. 10A and 10B are bar graphs showing the results of MTT assay for the plate experiment of 25 uL exosome-CAP from 80p or 120p 5 mins CAP treated KKU-055 cells treated on untreated KKU-055 cells.
Figure 10B:
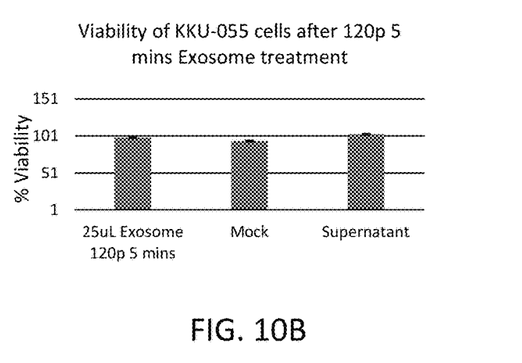
Figure 11A:
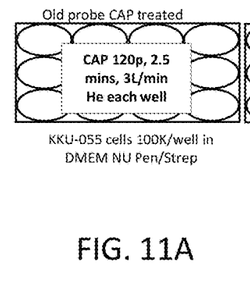
FIGS. 11A-11D illustrate plate designs of the CAP experiment on KKU-055 cells in Example 4.
Figure 11B:
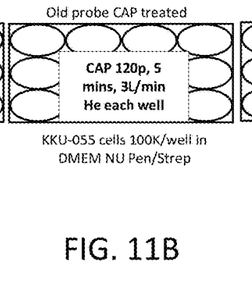
Figure 11C:
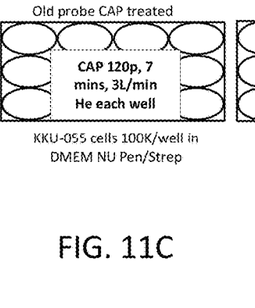
Figure 11D:
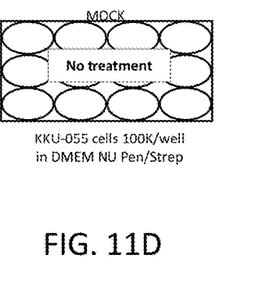

Procedure: The media of KKU-055 cells that were previously seeded on Day 0 were changed to DMEM+Synthetic serum+Pen/Strep media and 25 uL of exosomes from CAP treated and Mock treated cells were added to KKU-055 cells and incubated for 48 hours. The designs of the plates are as shown in FIGS. 8A and 8B.

Day 3

MTT assay was carried out 48 hours after exosome treatment on KKU-055 cells following the procedure.

A (3-(4,5-dimethylthiazolyl-2)-2,5-diphenyltetrazolium bromide) solution at a concentration of 5 mg/ml was made with PBS (10×) and vortexed until homogenous.

Diluted 10× solution with cell culture media to make 1×MTT solution.

Removed original cell culture media from 12-well plates. Add 1 ml MTT solution to each well.

Incubated for 2-4 hours at 37° C. (An incubation period of 2 hours is generally adequate but may be lengthened for low cell densities or cells with lower metabolic activity).

After the incubation period, removed MTT solution, add 1 ml solvent* to each well.

Make sure all purple formazan crystals are dissolved with a shaking procedure at "fast, double orbit 548 rpm" for at least 30 sec in a multiwell plate reader. Measure absorbance at a wavelength of 570 nm. Measure the background absorbance of multiwall plates without cells at 690 nm and subtract from the 570 nm measurement.

Conclusion: Application of exosomes of volume 25 uL from 80p 5 mins or 120p 5 mins CAP treated KKU-055 cells on untreated KKU-055 did not show any considerable difference in the viability compared to mock treated or supernatant.

Example 4

Day 1

The objective of this experiment was to determine increasing the volume to 50 uL of exosomes with/without from CAP treated KKU-055 cells at 120p 5 mins will have any survival effect of untreated KKU-055 cells.

Procedure: KKU-055 cells were cultured in DMEM Medium supplemented with 10% fetal bovine serum (Sigma-Aldrich, St. Louis, MO, USA) and 1% Pen Strep (Thermo Fisher Scientific, Waltham, MA, USA) in a 37° C. and 5% CO2 humidified incubator (Thermo Fisher Scientific, Waltham, MA, USA). When cells reached approximately 80% confluence, cells were seeded at a concentration of $10^5$ cells/well into 12-well plates (USA Scientific, Ocala, FL, USA) with a 1 mL media volume per well.

| Cell type | Total | Live | % | AVG viable cells | media |
|---|---|---|---|---|---|
| KKU-055 P14 | 3.56* 10^6 | 3.02 * 10^6 | 85 | 2.93* 10^6 | DMEM |
|  | 3.57* 10^6 | 2.84 * 10^6 | 80 |  | complete |

Procedure: KKU-055 cells were seeded at a density of 100 k cells/well in 4×12 wells plates each.
Day 2
Procedure: The media of KKU-055 cells that were seeded on Day 1 were changed to DMEM+synthetic serum+Pen/Strep media and CAP treated and Mock treated cells were and incubated for 28 hours. The designs of the plates are as shown in FIGS. 11A-11D.
Day 4
Procedure The new in-house Exosome solution (30% PEG) was used to precipitate exosomes from the supernatants of experiment Day 2. Exosome pellets were resuspended in 50 uL vol of PBS and stored at −80 C until use.

Example 5

Day 1
Procedure: KKU-055 cells were cultured in DMEM Medium supplemented with 10% fetal bovine serum (Sigma-Aldrich, St. Louis, MO, USA) and 1% Pen Strep (Thermo Fisher Scientific, Waltham, MA, USA) in a 37° C. and 5% CO2 humidified incubator (Thermo Fisher Scientific, Waltham, MA, USA). When cells reached approximately 80% confluence, cells were seeded at a concentration of $10^5$ cells/well into 12-well plates (USA Scientific, Ocala, FL, USA) with a 1 mL media volume per well.

| Cell type | Total | Live | % | AVG viable cells | media |
|---|---|---|---|---|---|
| KKU-055 P14 | 2.90* 10^6 | 2.17 * 10^6 | 75 | 2.17* 10^6 | DMEM |
|  | 2.86* 10^6 | 2.17 * 10^6 | 76 |  | complete |

Figure 12A:
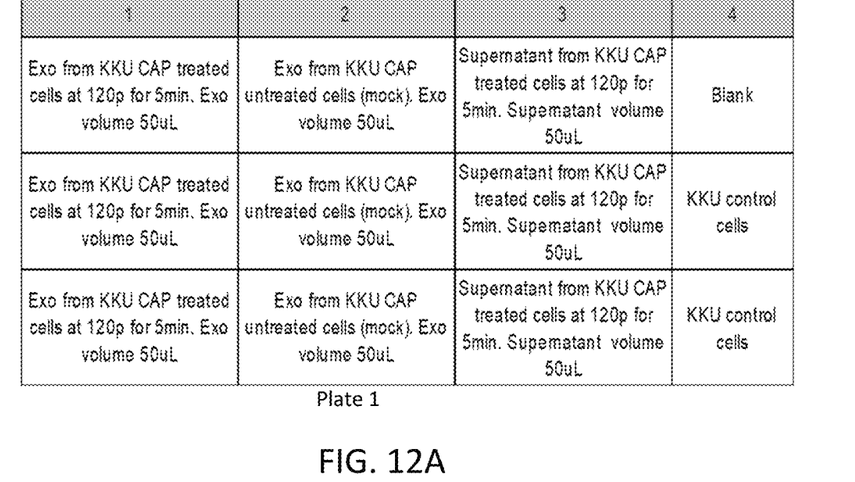
FIGS. 12A and 12B illustrate plate designs of Example 5 for 50 uL exosome-CAP from 120p 5 mins or 7 mins CAP treated KKU-055 cells treated on untreated KKU-055 cells
Figure 12B:
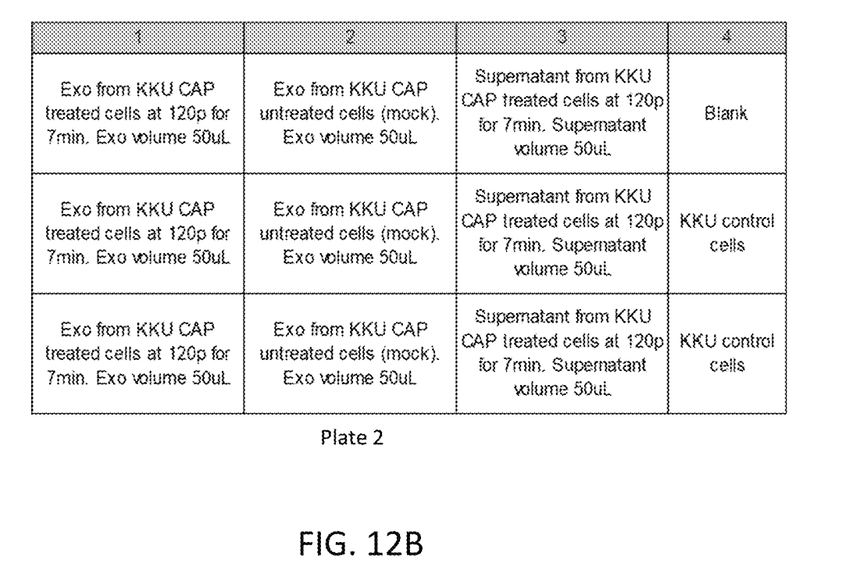
Figure 13:
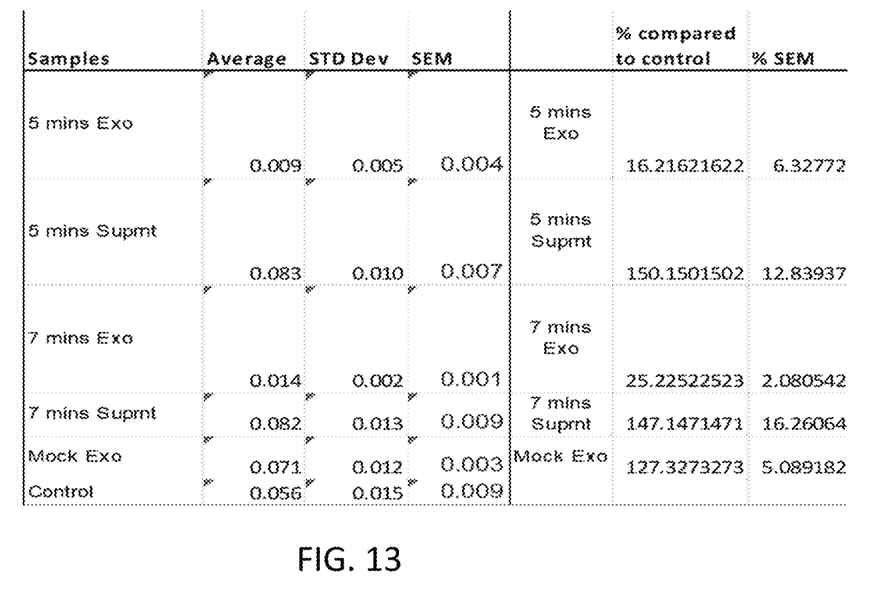
FIG. 13 is a table showing the raw data of MTT assay for the plate experiment of 50 uL exosome-CAP from 120p 5 mins or 7 mins CAP treated KKU-055 cells treated on untreated KKU-055 cells in Example 5.
Figure 14:
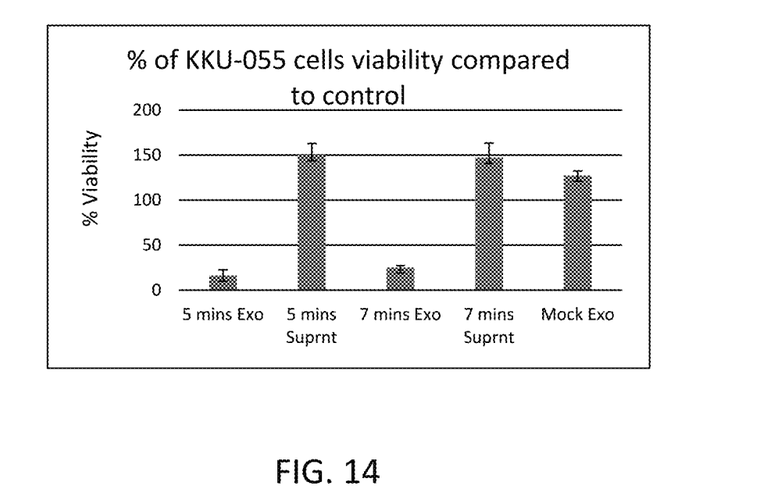
FIG. 14 is a bar graph showing the results of MTT assay for the plate experiment of 50 uL exosome-CAP from 120p 5 mins or 7 mins CAP treated KKU-055 cells treated on untreated KKU-05
Figure 15:
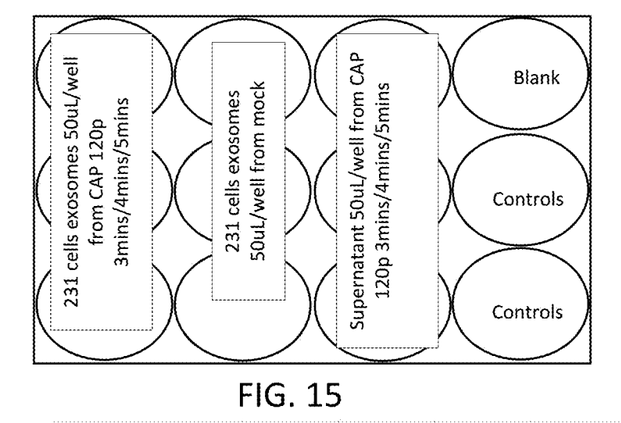
FIG. 15 illustrates the plate design of Example 6 for 50 uL exosome-CAP from 120p 3 min, 4 mins or 5 mins CAP treated MDA-MB-231 cells treated on untreated MDA-MB-231 cells 5 cells in Example 5.
Figure 16:
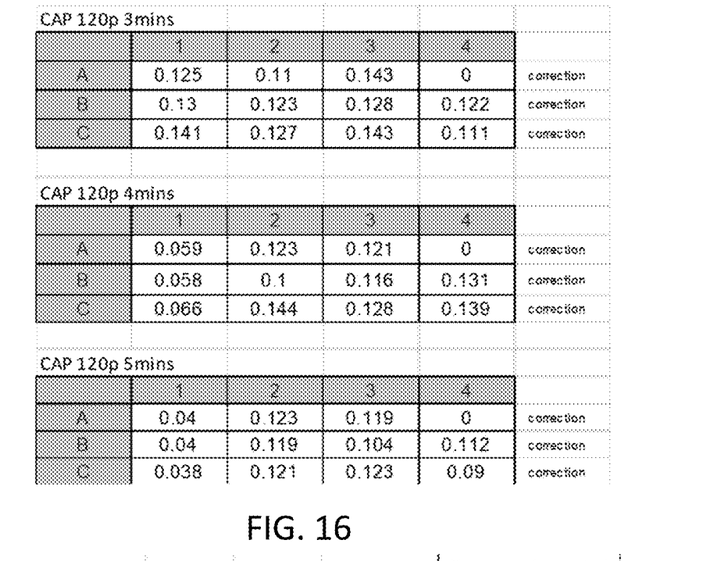
FIG. 16 is a table showing the raw data of MTT assay for the plate experiment of Example 6 of 50 uL exosome-CAP from 120p 3 min, 4 mins or 5 mins CAP treated MDA-MB-231 cells treated on untreated MDA-MB-231 cells.
Figure 17:
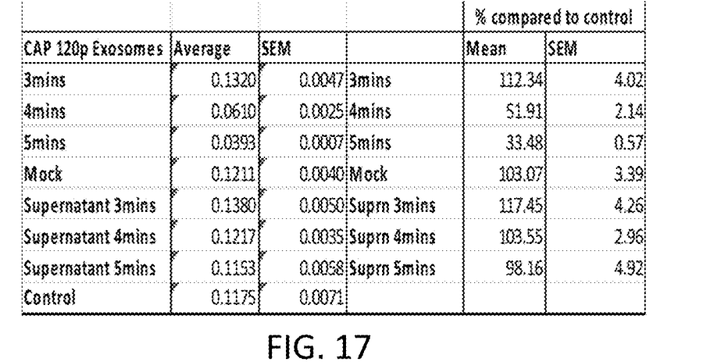
FIG. 17 is a bar graph showing the results of MTT assay for the plate experiment of Example 6 of 50 uL exosome-CAP from 120p 3 min, 4 mins or 5 mins CAP treated MDA-MB-231 cells treated on untreated MDA-MB-231 cells.

KKU-055 cells were seeded at a density of 100 k cells/well in 4×12 wells
Day 2
Procedure: The media of KKU-055 cells that were seeded on Day 1 were changed to DMEM
+NU+pen/strep and the cells were exosomes treated and Mock treated and incubated for 24 hours. The designs of the plates are as shown in FIGS. 12A and 12B.
Day 4
MTT assay was carried out 48 hours after exosome treatment on KKU-055 cells following the procedure.
A (3-(4,5-dimethylthiazolyl-2)-2,5-diphenyltetrazolium bromide) solution at a concentration of 5 mg/ml was made with PBS (10×) and vortexed until homogenous.

Diluted 10× solution with cell culture media to make 1×MTT solution.
Removed original cell culture media from 12-well plates. Add 1 ml MTT solution to each well.
Incubated for 2-4 hours at 37° C. (An incubation period of 2 hours is generally adequate but may be lengthened for low cell densities or cells with lower metabolic activity).
After the incubation period, removed MTT solution, add 1 ml solvent* to each well.
Make sure all purple formazan crystals are dissolved with a shaking procedure at "fast, double orbit 548 rpm" for at least 30 sec in a multiwell plate reader. Measure absorbance at a wavelength of 570 nm. Measure the background absorbance of multiwall plates without cells at 690 nm and subtract from the 570 nm measurement.
Conclusion: Application of exosomes of volume 50 uL from 120p 5 mins or 7 mins CAP treated KKU-055 cells on untreated KKU-055 shows significant difference in the viability compared to mock treated or supernatant cells.

Example 6

Objective: To determine if exosomes/micro vesicles harvested from MDA-MB-231 (Triple negative) cells with/without CAP treatment would induce cell death to CAP untreated cells.
Background/Rationale: Exosome harvested after CAP treatment in KKU-055 cells were treated on fresh KKU-055 cells and these cells showed cell death. This experiment was carried out to find out if Triple negative breast cancer cells (MDA-MB-231 cells exosomes will have similar effect.
Reagents: 1. RPMI media (10% FBS, 1% Pen/strep) 2. RPMI media (10% NU, 1% Pen/strep) 3. Exosome solution 4. MTT solution 5. MTT solvent.
Procedure:
1. Exosomes previously isolated from MDA-MB-231 cells (CAP 120p 3 min, 4 min and 5 min, incubated for 5 days) were treated (50 uL/well) on 231 cells (50K cells seeded on Nov. 9, 2019) and incubated for 2 days.
2. After the incubation the media from the cells were removed and 1 mL of MTT solution was added. Standard JCRI MTT assay protocol was carried out.
3. Absorbance measurement were recorded at 570 nm and results were stored on the google drive.

Conclusion: Application of exosomes of volume 50 uL from 120p 4 mins or 5 mins CAP treated MDA-MB-231 cells on untreated cells shows significant difference in the viability compared to mock treated or supernatant cells whereas 3 mins 120p CAP derived exosomes treated cells showed difference in viability compared to the controls.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:
1. A method for bioengineering exosomes for cancer treatment comprising the steps of:

isolating target tumor cells from a tissue sample;
culturing the isolated target tumor cells;
treating the cultured target tumor cells with cold atmospheric plasma to release exosomes from the target tumor cells; and
collecting the released exosomes;
wherein said target tumor cells comprise triple negative breast cancer cells.

2. The method for bioengineering exosomes for cancer treatment according to claim 1, wherein said step of culturing the target tumor cells comprises:
seeding the isolated target tumor cells in wells and incubating the target tumor cells in a culture media.

3. The method for bioengineering exosomes for cancer treatment according to claim 2, wherein the target tumor cells are incubated for 24 hours.

4. The method for bioengineering exosomes for cancer treatment according to claim 2, wherein the culture media comprises Dulbecco's Modified Eagle Medium, an antibiotic and 10% fetal bovine serum.

5. The method for bioengineering exosomes for cancer treatment according to claim 4, the step of culturing the target tumor cells further comprises replacing the culture media with Dulbecco's Modified Eagle Medium and an antibiotic.

6. The method for bioengineering exosomes for cancer treatment according to claim 1, wherein target tumor cells comprise one of U87 cells, KKU-055 cells and triple negative MDA-MB-231 cells.

7. The method for bioengineering exosomes for cancer treatment according to claim 1, wherein the step of treating the cultured target tumor cells with cold atmospheric plasma to release exosomes from the target tumor cells comprises treating the target tumor cells with cold atmospheric plasma for 4-10 minutes.

8. The method for bioengineering exosomes for cancer treatment according to claim 1, further comprising the step of incubating the target cancer cells after the step of treating the cultured target tumor cells with cold atmospheric plasma to release exosomes from the target tumor cells and before the step of collecting the released exosomes to produce conditioned media.

9. The method for bioengineering exosomes for cancer treatment according to claim 8, wherein the step of collecting the released exosomes comprises:
removing the conditioned media from the wells;
differentially centrifuging the conditioned media;
collecting a supernatant;
mixing the collected supernatant with an exosome isolation reagent;
incubating the mixture of the collected supernatant and the exosome isolation reagent;
centrifuging the mixture and collecting an exosome pellet; and
resuspending the exosome pellet in a buffering solution.

10. The method for bioengineering exosomes for cancer treatment according to claim 9, wherein the step of differentially centrifuging the conditioned media comprises centrifuging the conditioned media at 300×g, 1500×g, 4500×g and 10,000×g.

11. The method for bioengineering exosomes for cancer treatment according to claim 9, wherein the step of collecting the released exosomes further comprises storing the re-suspended exosomes at −80 C.

12. The method for bioengineering exosomes for cancer treatment according to claim 7, further comprising the step of incubating the target cancer cells after the step of treating the cultured target tumor cells with cold atmospheric plasma to release exosomes from the target tumor cells and before the step of collecting the released exosomes to produce conditioned media.

13. The method for bioengineering exosomes for cancer treatment according to claim 3, wherein the culture media comprises Dulbecco's Modified Eagle Medium, an antibiotic and 10% fetal bovine serum.

* * * * *